Patented Sept. 5, 1922.

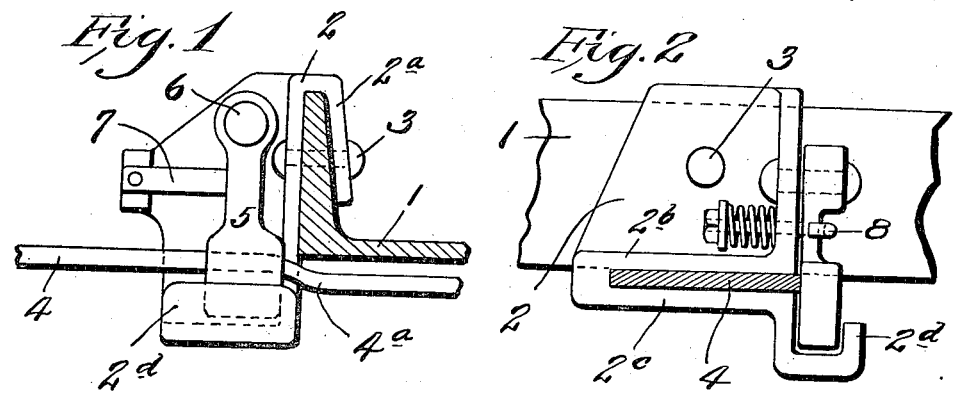
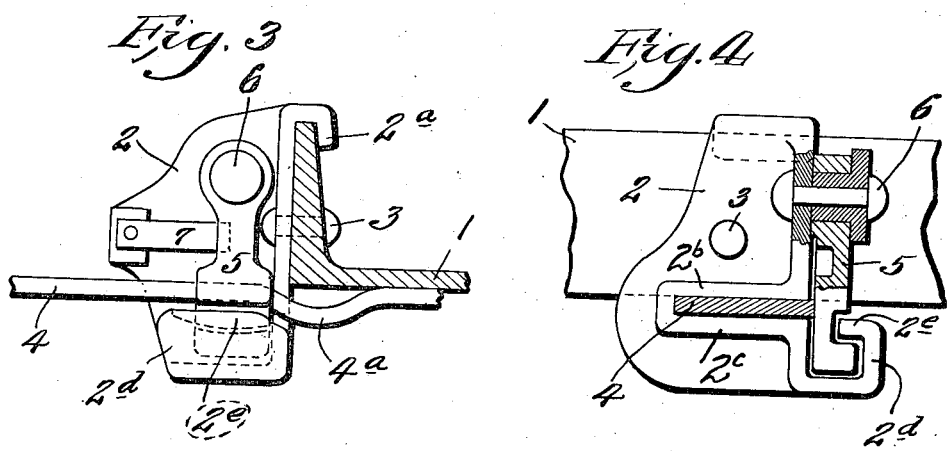
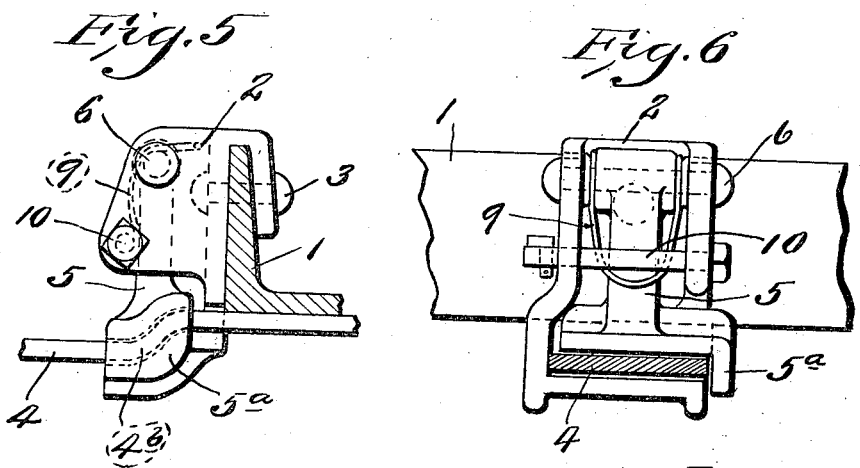

1,428,214

UNITED STATES PATENT OFFICE.

EDWIN G. BUSSE AND ARTHUR W. HAWKINS, OF CHICAGO, ILLINOIS, ASSIGNORS TO CHICAGO RAILWAY EQUIPMENT COMPANY, OF CHICAGO, ILLINOIS, A CORPORATION OF ILLINOIS.

THIRD OR FOURTH POINT SUPPORT BRACKET FOR BRAKE RIGGING.

Application filed August 12, 1921. Serial No. 491,799.

*To all whom it may concern:*

Be it known that we, EDWIN G. BUSSE and ARTHUR W. HAWKINS, citizens of the United States, residing at city of Chicago, county of Cook, and State of Illinois, have invented a certain new and useful Improvement in Third or Fourth Point Support Brackets for Brake Rigging, of which the following is a full, clear, and exact description, such as will enable others skilled in the art to which it appertains to make and use the same, reference being had to the accompanying drawings, forming part of this specification, in which—

Figure 1 is an edge elevational view of our improved brake beam third or fourth point suspension support-mount or bracket.

Figure 2 is a side elevational view of a slightly modified form.

Figure 3 is an edge elevational view of another modified form.

Figure 4 is a side elevational view of the form shown in Figure 3.

Figure 5 is an edge elevational view of another modified form.

Figure 6 is a side elevational view of the form shown in Figure 5.

This invention relates to a new and useful improvement in third or fourth point suspension support-mounts or brackets for brake beams, being designed particularly as an improvement on the form of mounts shown in the patents to Charles Haines Williams, No. 1,080,741, dated December 9, 1913, and No. 1,126,238 dated January 26, 1915, the object of our present invention being to arrange a mount which can be applied to the side edge of the spring plank of a truck, which mount is composed of articulated members, one of which may be gravitating whereby it will swing to its closed position, there being means for locking and holding said closing member in position and said locking means may be yielding, if desired.

In a companion application filed by Ernest A. Le Beau, August 2, 1921, Serial No. 489,241 there is shown and described a form of bracket mount for third or fourth point supports in which the gravitating locking or holding member for the track or spring support moves or swings in a direction transverse to the longitudinal axis of the support, thereby forming a closure for the recess between the jaws wherein or between which the support is mounted.

In this present invention, we make use of a gravitating closing member, but it is pivoted to move or swing in a direction parallel to the longitudinal axis of the support and in certain forms of our invention, this gravitating member may be arranged wholly to one side of the support or may be in vertical alignment with the support so as to engage the upper face thereof and by providing the support with a jog or bend to prevent longitudinal movement of the support, the gravitating member being provided with a lateral lip or lug arranged to one side of the support to prevent lateral displacement of the support.

In the drawings, 1 indicates the spring plank of a car truck, here shown as being in the form of a channel to which the bracket member 2 is secured by means of a rivet 3. This bracket member is provided with an overhanging lip $2^a$ at its upper end, while its lower end is formed with two jaws $2^b$ and $2^c$, said jaws providing a recess into which a third or fourth point supporting spring or track 4 is received.

5 indicates a member pivoted by means of a rivet 6 to the member 2, said member 5 being movable in a plane relatively parallel to the longitudinal axis of the support 4.

As shown in Figures 1 to 4 inclusive, jaw $2^c$ is extended laterally and provided with a lip $2^d$ constituting a keeper for the lower end of pivoted member 5 which lower end is designed to lie along side of the edge of the support 4.

7 indicates a flat leaf spring designed to engage in front of the pivoted member 5 to lock it in its closed position.

In Figure 2, we have shown a spring pressed hook 8 which serves as a lock for the gravitating member 5.

In order to prevent longitudinal movement of the support in the brackets, the same may be provided with a jog or bend $4^a$, as shown in Figures 1 and 3.

In Figures 3 and 4, we have shown the lip $2^b$ as having an inwardly extending lug $2^e$ designed to enter a slot in the outer face of the gravitating member 5.

In Figures 5 and 6, we have shown a construction in which the gravitating member is normally closed by means of a torsion spring 9, there being a locking bolt or pin 10 passing through lugs or ears in the bracket 2 for securing the gravitating member 5 in its operative position.

In this form of our invention, the gravitating member 5 is pivotally mounted in a vertical plane above the support 4 and its lower face is shaped to form a jog or bend 4$^b$ in said support, one end of said gravitating member being provided with a lip 5$^a$ which extends down along the side of the support 4 to prevent lateral displacement thereof.

In operation there is a mount or bracket for the support 4 secured to the edge of the spring plank and when the support 4 is placed in position, the jogs or bends 4$^a$ or 4$^b$ prevent its longitudinal movement. The engagement of the side edge of the support, or the closing of the recess formed by the jaws which receive the support, prevents lateral displacement of the support; and in the form shown in Figures 5 and 6, the gravitating member being located in a vertical plane of the support and engaging the jog or bend thereof has a camming action on the upper face of the support which tends to prevent rattling, the lip 5$^a$ preventing lateral displacement of the support. Yielding or positive locks are preferably employed for holding the gravitating member in its operative position.

We claim:

1. A brake beam third or fourth point suspension support-mount comprising a member provided with a jaw, and a member movable in a direction parallel to the longitudinal axis of said support for holding it in position on said jaw.

2. A brake beam third or fourth point suspension support-mount comprising a member adapted to be connected to a part of the car truck and providing a seat for the support, another member pivotally connected to the first-mentioned member and adapted to engage the upper face of the support for holding it to its seat.

3. The combination with a part of a car truck, of a third or fourth point support detachably associated therewith, said support having a bend, a bracket mount on the car truck providing a seat for said support, and movable means on said bracket cooperating with the bend of said support to hold it in its seat.

4. The combination of a car truck, a third or fourth point support detachably associated therewith, a bracket mount providing a seat for said support, and means cooperating with the upper face and side edge of said support for holding it in its seat.

5. The combination with a part of a car truck, a third or fourth point support detachably associated therewith, a bracket mount providing a seat for said support, said support having a bend cooperating with said bracket mount to prevent longitudinal movement of the support, pivoted means for holding said support in its seat, and means for locking said pivoted means in position.

In testimony whereof we hereunto affix our signatures this 3rd day of August, 1921.

EDWIN G. BUSSE.
ARTHUR W. HAWKINS.